United States Patent
List et al.

(10) Patent No.: US 10,836,338 B2
(45) Date of Patent: Nov. 17, 2020

(54) METHOD AND DEVICE FOR MONITORING AN ENERGY RESERVE AND SAFETY DEVICE FOR A VEHICLE

(71) Applicant: Robert Bosch GmbH, Stuttgart (DE)

(72) Inventors: Carsten List, Walheim (DE); Hartmut Schumacher, Freiberg (DE); Falko Sievers, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 163 days.

(21) Appl. No.: 14/369,293

(22) PCT Filed: Dec. 21, 2012

(86) PCT No.: PCT/EP2012/076742
§ 371 (c)(1),
(2) Date: Jun. 27, 2014

(87) PCT Pub. No.: WO2013/098260
PCT Pub. Date: Jul. 4, 2013

(65) Prior Publication Data
US 2015/0120084 A1    Apr. 30, 2015

(30) Foreign Application Priority Data

Dec. 27, 2011 (DE) .................. 10 2011 089 976

(51) Int. Cl.
*B60R 21/017* (2006.01)
(52) U.S. Cl.
CPC ........ *B60R 21/017* (2013.01); *B60R 21/0173* (2013.01)

(58) Field of Classification Search
CPC ........... B60R 21/01; B60R 2021/01122; B60R 2021/01211; B60R 2021/01163; B60R 21/017; B60R 21/0173; B60L 1/00; H02J 9/002; G01R 27/26
USPC ........................ 701/1, 45; 280/735; 307/10.1
See application file for complete search history.

(56) References Cited

U.S. PATENT DOCUMENTS

| | | | | |
|---|---|---|---|---|
| 5,541,523 A | * | 7/1996 | Tourville | G01R 31/2829 280/735 |
| 7,048,303 B2 | * | 5/2006 | Hanazaki | B60R 21/017 280/735 |
| 2014/0043034 A1 | | 2/2014 | Hemon et al. | |

FOREIGN PATENT DOCUMENTS

| | | | |
|---|---|---|---|
| CN | 1139759 A | | 1/1997 |
| DE | 196 14 365 | | 10/1996 |
| DE | 196 44 858 | | 5/1997 |
| DE | 197 09 234 | | 9/1997 |
| EP | 0 577 988 | | 1/1994 |
| JP | 6 331669 | | 12/1994 |
| JP | 0840184 A | | 2/1996 |
| JP | 08336233 A | | 12/1996 |
| JP | 2003127822 A | * | 5/2003 |
| JP | 2009021764 A | | 1/2009 |
| JP | 2009241764 A | | 10/2009 |

(Continued)

*Primary Examiner* — Isaac G Smith
(74) *Attorney, Agent, or Firm* — Norton Rose Fulbright US LLP; Gerard Messina

(57) ABSTRACT

A method for monitoring an energy reserve for a safety device for a vehicle includes the task of evaluating a change of a voltage present in the energy reserve between a starting value suitable for operating the safety device and a test voltage value suitable for operating the safety device to monitor the energy reserve.

6 Claims, 3 Drawing Sheets

(56) References Cited

FOREIGN PATENT DOCUMENTS

KR    20110062990 A    6/2011

\* cited by examiner

METHOD AND DEVICE FOR MONITORING AN ENERGY RESERVE AND SAFETY DEVICE FOR A VEHICLE

FIELD OF THE INVENTION

The present invention relates to a method for monitoring an energy reserve for a safety device for a vehicle, to a corresponding device, to a safety device for a vehicle and to a corresponding computer program product.

BACKGROUND INFORMATION

Airbag control units have a dedicated energy store in the form of multiple aluminum electrolyte capacitors. Such an energy reserve capacity ensures the complete function of the airbag system for a predetermined period of time, even without an external power supply, for example, when the vehicle battery is disconnected in the event of a crash.

SUMMARY OF THE INVENTION

Against this background, the present invention introduces a method for monitoring an energy reserve for a safety device for a vehicle, in addition to a device which uses this method and a safety device for a vehicle, and finally a corresponding computer program product as recited in the main claims. Advantageous embodiments result from the respective subclaims and from the following description.

Vehicles which have a safety device, in particular an occupant protection device, may include an independent energy reserve for the safety device. The independent energy reserve may ensure trouble-free operation of the safety device, even in the event of failure of a main power supply of the safety device.

The energy reserve may be initially tested during a system run-up or during switch off. It is advantageous, however, if the availability of the energy reserve is tested in addition or alternatively during an operation of the vehicle, for example, during an instantaneous driving cycle of the vehicle. Such a monitoring during the driving cycle may be carried out continuously or cyclically.

A functional capacity of the energy reserve may be checked based on a change in voltage in the energy reserve. To ensure an operational readiness of the safety device even during the checking of the energy reserve, the change in voltage may be carried out within a voltage range which is limited by admissible operating voltage values for the safety device.

The approach may be used, for example, in conjunction with airbag systems. This may improve the quality of the airbag control unit diagnosis and increase the cyclical error detection rate. Thus, a hardware defect present in the energy reserve may also be determined during the driving cycle and the driver may be informed of the restricted system functionality.

The functionality of the energy reserve capacity may be advantageously tested during cyclical operation. This ensures that the driver may be informed of potential defects in the energy store at any time. This reduces the risk of a restricted release readiness of the airbag system with no previous fault indication, and corresponding customer requirements for permanently monitoring the energy reserve may be met. Such an approach offers advantages over a diagnostic capability which is available only initially or at the end of the operating cycle. Another advantage of the cyclical test procedure is that other functions and the system availability are virtually unaffected.

For example, the voltage present at the energy reserve may only be lowered during the change in voltage to the point that a functional capacity of circuit components of the safety device is fully ensured. On the other hand the voltage present in the energy reserve may only be increased during the change in voltage to the point that a sufficiently large safety distance from the terminal voltage of an overvoltage protector is maintained, for example, a protection against electrostatic discharge, also referred to as ESD protection. The voltage range defined in this way is large enough to determine the capacity of the energy reserve without jeopardizing the operational readiness of the safety device.

The present invention provides a method for monitoring an energy reserve for a safety device for a vehicle, which includes the following step:

Evaluating a change in voltage of a voltage present in the energy reserve between a starting value suitable for operating the safety device and a test voltage value suitable for operating the safety device in order to monitor the energy reserve.

The vehicle may be a motor vehicle, for example, a passenger vehicle, a truck or some other utility vehicle. A safety device may be understood to mean an occupant protection system, such as an airbag system or belt tensioner. An energy reserve may be understood to mean an energy reserve capacity, such as an aluminum electrolyte capacitor. During normal operation, the safety device may be supplied by a power supply with an operating voltage required for operating the safety device. During normal operation, the energy reserve may be charged by the power supply. In the event of failure of the power supply, for example, due to an accident, the energy reserve may be configured to supply the safety device with an operating voltage necessary to operate the safety device. For example, the energy reserve may be configured to supply energy necessary for activating the safety device. By monitoring the energy reserve it is possible, in particular, to check a functional capacity of the energy reserve. In particular, it may be checked whether the energy reserve is able to supply sufficient energy for operating the safety device in the event of a failure of the power supply. Monitoring of the energy reserve may be carried out during a driving cycle of the vehicle. The driving cycle may correspond to an operating cycle of the vehicle which, in addition to the driving of the vehicle, may also include operation-related stops, such as at a traffic light or in stop-and-go traffic. Thus, the energy reserve may be monitored during the operation of the vehicle and, in particular, as the vehicle is traveling. The starting value and the test voltage value may differ from one another.

For example, the starting value may be an operating voltage value maximally suited for operating the safety device, and the test voltage value may be an operating voltage value minimally suited for operating the safety device, or vice versa. The starting value and the test voltage value may also lie in a voltage range between the operating voltage values maximally and minimally suited for operating the safety device. In addition, the first or test voltage value may be a value of a normal operating voltage which is also present in the energy reserve when no monitoring of the energy reserve is being carried out. Suitable for operating the safety device may mean that the functionality of the safety device is ensured at the respective operating voltage value. A monitoring signal may be generated independently of the evaluation of the change in voltage, which may indicate a functional state of the energy reserve.

The step of evaluating may be repeated several times during a driving cycle of the vehicle. For example, the method may be repeated cyclically. In this way, a monitoring of the energy reserve may be carried out after predetermined intervals, in each case anew. In addition, the method may be carried out in response to one or multiple predefined events which may occur during the driving cycle. Thus, the energy reserve, depending on the requirements profile, may be checked once, multiple times, at fixed points in time or in response to events resulting from the driving cycle. Such a freely definable monitoring option during normal operation of the vehicle represents an improvement over the strict measuring of a voltage delta in the energy reserve carried out initially.

An implementation of the step of evaluation or an implementation of the method in general may be prevented if an imminent use of the energy reserve is detected. For example, in a step of receiving, a lock signal may be received which indicates an activation of the safety device or an imminent or actual collision of the vehicle. In response to receiving the lock signal, an implementation of the method may be prevented or ended. In other words, the method may only be implemented if no activation of the safety device, or no imminent or actual collision of the vehicle, is indicated.

During the changing process, the voltage present in the energy reserve may be altered between the starting value and the test voltage value in order to cause the change in voltage. In this way, the change in voltage may be specifically induced in order to be able to monitor the energy reserve. Depending on the specific embodiment, the voltage for inducing the change in voltage may be raised or lowered. Because the change in voltage occurs within the voltage range defined by the starting value and the test voltage value, it is possible to ensure the functionality of the energy reserve and the safety device even during monitoring.

During the changing process, the voltage present in the energy reserve may be varied between the test voltage value and the starting value. This variation may be carried out counter to the change in voltage effected for monitoring the energy reserve. As a result of this variation, it is therefore possible to again reverse the change in voltage effected for monitoring the energy reserve. In this case, the variation in voltage may occur chronologically after the change in voltage effected for monitoring the energy reserve. Alternatively, the variation in voltage may also occur chronologically before the change in voltage effected for monitoring the energy reserve. By varying the voltage chronologically before or after the change in voltage for monitoring the energy reserve, it is possible to ensure that when monitoring of the energy reserve is completed, the operating voltage value present initially which was also present in the energy reserve before the start of monitoring is again present in the energy reserve. In this way, the functionality of the energy reserve and the safety device may be ensured even after monitoring.

According to one specific embodiment, it may be evaluated during the step of evaluating whether as a result of the change in voltage the voltage present in the energy reserve reaches the test voltage value within a predetermined period of time. The predetermined period of time may start with a start of the change in voltage. In this case, the change in voltage, beginning with the starting value, may be carried out until either the test voltage value is reached within the predetermined period of time, or the predetermined period of time has elapsed. In such a case, the starting value may correspond to a value of a normal operating voltage, which is also present in the energy reserve when, in particular, no monitoring of the energy reserve is carried out. If the test voltage value is reached within the predetermined time period, it may then be concluded that the energy reserve has failed or malfunctioned. Otherwise, the energy reserve may be considered to be functional.

Here, the voltage present in the energy reserve may be changed to the starting value as soon as the voltage present in the energy reserve, as a result of the change in voltage, reaches the test voltage value within the predetermined period of time. In this way, the voltage may be prevented from dropping too far, which could then jeopardize the operational readiness of the safety device. If the voltage present in the energy reserve does not drop down to the test voltage value within the predetermined period of time, the voltage present in the energy reserve may be changed back to the starting value upon lapse of the predetermined period of time.

According to another specific embodiment, a period of time of the change in voltage between the starting value and the test voltage value may be evaluated during the step of evaluating. In this case, the change in voltage, beginning with the starting value, may be carried out until the test voltage value is reached. A capacity of the energy reserve may, with knowledge of the current flowing during the change in voltage, the voltage difference of the change in voltage and the period of time, be determined with a high degree of accuracy.

In the different specific embodiments, the starting value may be smaller than the test voltage value. Consequently, the energy reserve is charged due to the change in voltage. In this specific embodiment, it is advantageous that no useable energy is required to be withdrawn from the energy reserve. Thus, the voltage of the energy reserve is not lowered below a normal operating voltage of the energy reserve as a result of monitoring the energy reserve.

Alternatively, the starting value may be greater than the test voltage value. In this case, the change in voltage may be carried out simply by connecting a consumer, for example, a discharge resistance. So that the voltage of the energy reserve is not lowered below a normal operating voltage of the energy reserve due to monitoring of the energy reserve, the voltage in the energy reserve may, beginning with the normal operating voltage, first be raised to the starting value before the change in voltage is carried out.

According to one specific embodiment, a drop in the voltage present in the energy reserve may be generated by the occurrence of leakage currents. In this case, no active discharge is necessary. A charging operation for generating the change in voltage to be evaluated may start as soon as the voltage has dropped to the starting value. Correspondingly, a charging operation for maintaining the normal operating voltage present in the energy reserve may start as soon as the voltage has dropped to the value of the normal operating voltage due to leakage currents from the test voltage value.

The present invention further provides a device for monitoring an energy reserve for a safety device for a vehicle, the device being configured to carry out or implement the steps of the method according to the present invention in a corresponding device. With this embodiment variant of the present invention in the form of a device as well, the object underlying the present invention may be quickly and efficiently achieved.

In the present case, a device may be understood to mean an electrical device which processes sensor signals and in response thereto outputs control signals and/or data signals.

The device may include an interface which may be configured on the hardware side and/or software side. In a hardware configuration, the interfaces may, for example, be part of a so-called ASIC system which includes a wide variety of functions of the device. It is also possible, however, for the interfaces to be independent, integrated circuits or at least to be made at least partially of discrete components. In a software configuration, the interfaces may be software modules present, for example, in a microcontroller in addition to other software modules.

The present invention further provides a safety device for a vehicle including the following features:
  a safety device;
  an energy reserve for the safety device; and
  a device for monitoring the energy reserve.

A safety device may be understood to mean a system consisting of a safety device, an energy reserve for the safety device and a monitoring device. A safety device may be understood to mean an occupant protection system. The occupant protection system may be a restraint system which may include, for example, an airbag and/or a belt tensioner as well as a control unit for a corresponding restraint system. The control unit for the restraint system, the energy reserve for the safety device and the device for monitoring the energy reserve may be situated together in a housing. The energy reserve may be connected via an electric lead to the safety device in order to be able to provide the energy required for operating or for activating the safety device. The device for monitoring may be coupled to the energy reserve in order, for example, to be able to detect the change in voltage of the voltage present in the energy reserve. The device for monitoring may include an interface for outputting a monitoring signal.

Also advantageous is a computer program product including program code which may be stored on a machine-readable medium such as a semiconductor memory, a fixed disk memory or an optical memory and is used for carrying out the method according to one of the previously described specific embodiments when the program is executed on a computer or a device.

The present invention is explained by way of example in greater detail below with reference to the appended drawings.

DETAILED DESCRIPTION

Figure 1A:
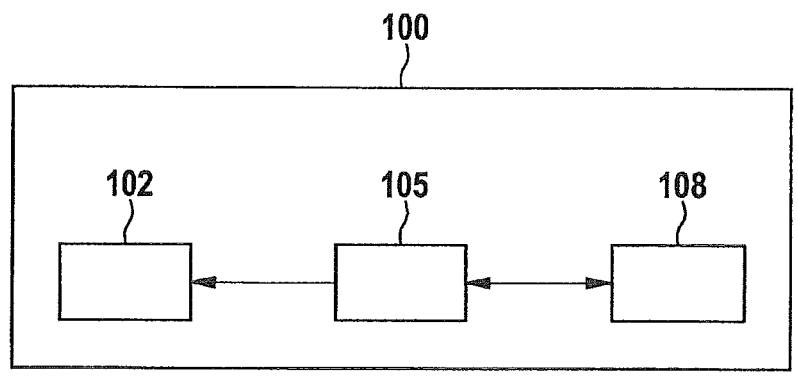
FIG. 1a schematically shows a representation of a vehicle, including a device for monitoring the energy reserve according to one exemplary embodiment of the present invention.

In the following description of exemplary embodiments of the present invention, identical or similar reference numerals are used for elements which are similarly operative and represented in the various figures, so that a repeated description of these elements is omitted.

FIG. 1a schematically shows a representation of a vehicle 100 including a safety device 102, an energy reserve 105 for safety device 102 and a device 108 for monitoring energy reserve 105 according to one exemplary embodiment of the present invention.

A safety device 102 may be an airbag system, which includes, for example, an airbag and a control unit for controlling the at least one airbag. Safety device 102 may, however, also represent another occupant protection system. For example, safety device 102 may, in addition to or as an alternative to an airbag, also include other restraint devices, belt tensioners, roll-bars or the like, and corresponding controls. Energy reserve 105 is connected to safety device 102 and is configured to supply energy to safety device 102 for operating safety device 102 at least during the failure of a main power supply. Device 108 for monitoring is coupled to energy reserve 105 in order to monitor a functional capacity of energy reserve 105. For this purpose, device 108 for monitoring is configured to evaluate a change in voltage in energy reserve 105. In addition, device 108 for monitoring may be configured to carry out the change in voltage in energy reserve 105.

Figure 1B:
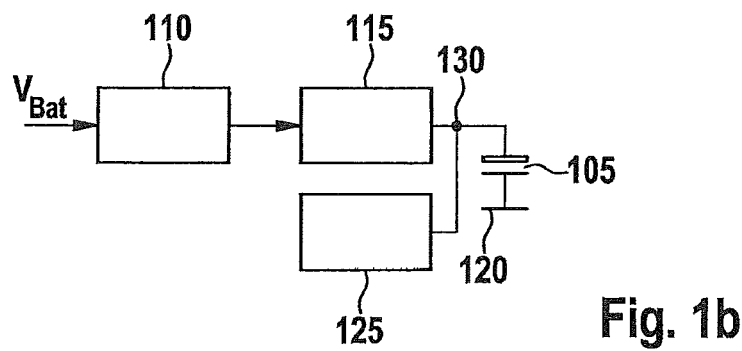
FIG. 1b shows a block diagram of one exemplary embodiment of the present invention.

FIG. 1b shows a block diagram of a charge and discharge circuit of an energy reserve 105 according to one exemplary embodiment of the present invention. Energy reserve 105 may be the energy reserve for a safety device of a vehicle shown in FIG. 1a. The circuit includes a converter 110, which is implemented as a DC/DC step-up converter, a charge circuit 115 for energy reserve 105 connected to ground 120 and a discharge circuit 125 for energy reserve 105.

Step-up converter 110 is fed with voltage $V_{Bat}$ at an input of an on-board battery of the vehicle. An output of step-up converter 110 is connected to integrated charge circuit 115 for energy reserve 105 and supplies a voltage converted from voltage $V_{Bat}$ to an input of charge circuit 115. An output of charge circuit 115 is connected to a terminal of energy reserve 105. Charge circuit 115 is configured to supply a charge voltage to energy reserve 105 for charging energy reserve 105. Another terminal of energy reserve 105 is connected to ground 120. Positioned parallel to charge circuit 115 is discharge circuit 125 for discharging energy reserve 105. A terminal of circuit 125 for discharging the energy reserve is connected to a node 130. The node is also situated between circuit 115 for charging the energy reserve and a terminal of energy reserve 105. A voltage measurement may be carried out at node 130, where the measurement may be carried out either by an analog/digital converter or by a circuit having fixed comparator thresholds. For example, the measurement may be carried out from the device for monitoring the energy reserve shown in FIG. 1a. Charge circuit 115 and discharge circuit 125 may each include control inputs, via which a charge function of charge circuit 115 and a discharge function of discharge circuit 125 may be controlled. A corresponding control may, for example, be carried out from the device for monitoring the energy reserve.

In the event of a failure of battery voltage $V_{Bat}$, the safety device may be operated via energy reserve 105.

An exemplary embodiment of the present invention relating to an airbag system of a vehicle is described below with reference to FIG. 1b. The airbag system includes energy reserve 105. FIG. 1b shows a block diagram of the energy reserve-charge/discharge circuit of the airbag system.

The power supply concepts of the airbag system provide that in the event of a battery separation, i.e., for example, a disconnection in the event of a crash, all system components may at least temporarily also be supplied self-sufficiently from separate energy store 105, in this case an energy reserve capacity. This system state is called self-sufficiency.

With the aid of the integrated charge circuit in the form of DC/DC switch converter 110, including current limiter 115, energy reserve 105 is initially charged to a high voltage level (for example, 33 V) and then serves as a central power source for the entire airbag system self-sufficiently. The capacitance value of energy reserve 105 is initially measured during system start-up, and is evaluated with the aid of software diagnosis in the airbag system. In the event of a defect, i.e., too little energy reserve capacitance, a system error is stored and the driver is informed by the activated airbag warning light. If the defect in the energy reserve capacitance occurs only during the course of the operating cycle, the defect may be handled in the instantaneous cycle with the aid of a diagnosis and an error display. Thus, it is also possible to detect cyclically any errors existing in energy reserve capacitance 105 and to inform the driver when the system availability is affected. The central mechanism of the test is to briefly increase or reduce the voltage present in energy reserve 105 from the nominal value 33 V to a different level and to monitor this process. In the process, the change in voltage is kept low enough so that no other circuit components are disrupted or the period of self-sufficiency is not affected. For example, lowering the voltage in the energy reserve Elko too much would shorten the period of self-sufficiency if the battery disconnection occurs immediately after the start of the test.

Figure 1C:
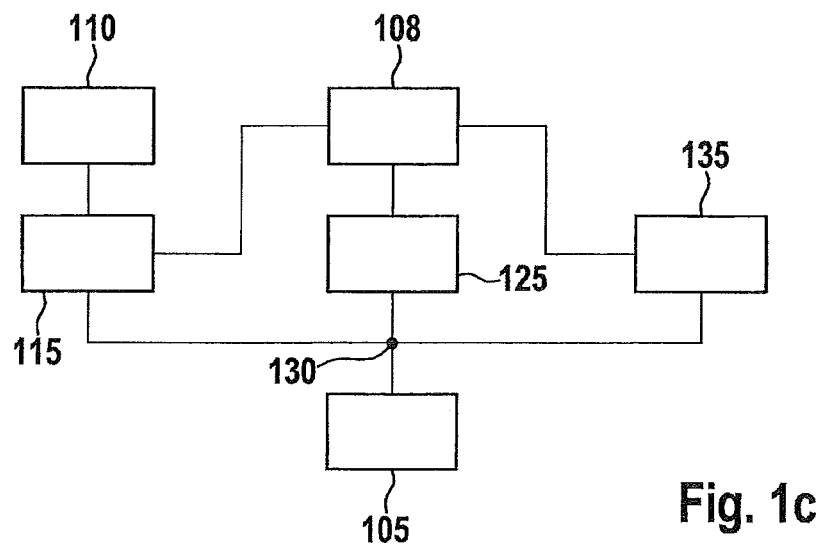
FIG. 1c shows a device for monitoring an energy reserve for a safety device for a vehicle according to one exemplary embodiment of the present invention.

FIG. 1c shows a circuit including a device 108 for monitoring an energy reserve 105 for a safety device for a vehicle according to one exemplary embodiment of the present invention. Shown is the arrangement described previously with reference to FIG. 1b, consisting of a converter 110, a charge circuit 115 and a discharge circuit 125. Terminals of the charge circuit 115, the discharge circuit 125 and energy reserve 105 are connected to one another via a shared node 130.

A detection unit 135 is connected to node 130. Detection unit 135 is configured to carry out a voltage measurement at node 130. Thus, detection unit 135 is configured to detect a voltage present in energy reserve 105. Detection unit 135 is configured to supply values of the detected voltage to device 108.

During normal operation, the safety device is supplied by an energy supply with an operating voltage necessary for operating the safety device. Energy reserve 105 is charged by the energy supply during normal operation. In the event of a failure, for example, due to an accident, energy reserve 105 is configured to supply the safety device with the operating voltage necessary for operating the safety device. Energy device 105 is sized in order to supply energy necessary for activating the safety device. Device 108 is configured to monitor whether energy reserve 105 is able to supply sufficient energy for operating the safety device in the event of a failure of the power supply.

For this purpose, device 108 is configured to control charge circuit 115 and discharge circuit 125 in order to effect a change in voltage in energy reserve 105. Device 108 is configured to evaluate the change in voltage detected by detection unit 135 and in response to the evaluation of the change in voltage to decide whether energy reserve 105 is functioning error-free or whether it is defective. If energy reserve 105 is classified as defective, device 108 may then output a warning signal which warns of the defect of energy reserve 105.

Figure 2:
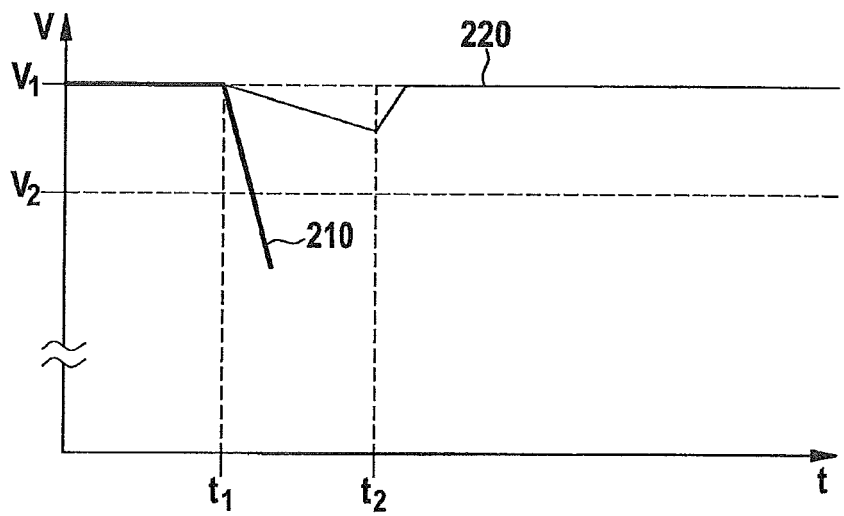
FIG. 2 shows a graphic representation of a voltage present in an energy reserve for a safety device during a monitoring process according to one exemplary embodiment of the present invention.
Figure 3:
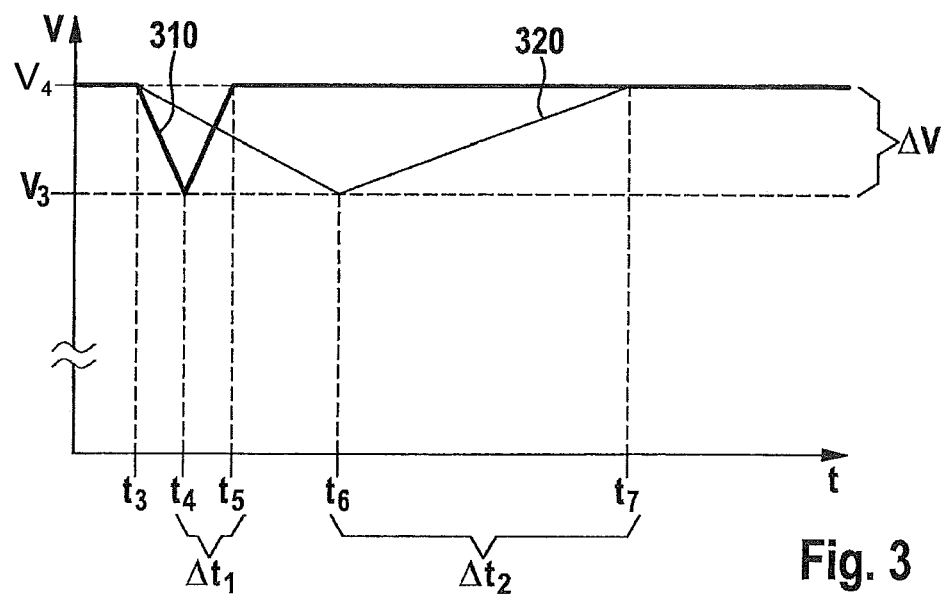
FIG. 3 shows a graphic representation of the voltage present in a safety device for an energy reserve according to one exemplary embodiment of the present invention.
Figure 4:
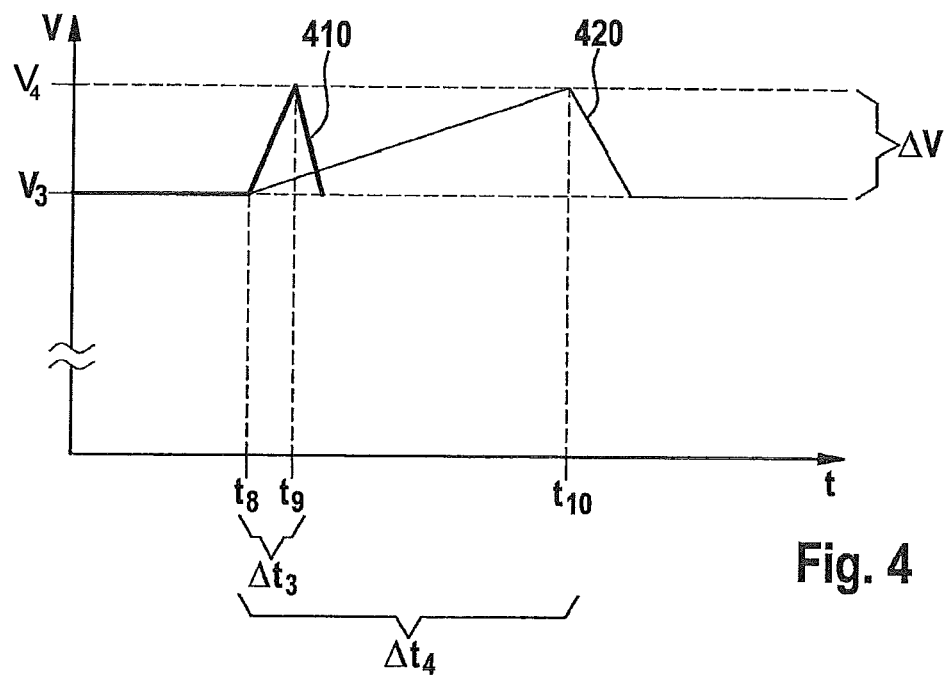
FIG. 4 shows a graphic representation of the voltage present in a safety device for an energy reserve according to another exemplary embodiment of the present invention.

Depending on the exemplary embodiment, device 108 is configured to monitor the time or the voltage during a charging operation or alternatively a discharging operation of energy reserve 105 by controlling charge circuit 115 and discharge circuit 125. FIGS. 2 through 4 show voltage curves for corresponding exemplary embodiments of the present invention.

According to one exemplary embodiment of the present invention, described below in greater detail with reference to FIG. 2, charge circuit 115 is deactivated and discharge circuit 125 is activated for monitoring energy reserve 105. Device 108 is configured for evaluating the voltage drop detected by detection unit 135 in energy reserve 105 from the moment of discharge. If within a predefined period from the moment of discharge, the voltage present in energy reserve 105 does not fall below a predefined threshold, energy reserve 105 is detected as adequate. If within the predefined period from the moment of discharge the voltage present in energy reserve 105 drops below the predefined value, device 108 is configured to disconnect discharge circuit 125 from energy reserve 105 and to activate charge circuit 115. In this way, the voltage in energy reserve 105 may be prevented from dropping too low as a result of the monitoring and thereby jeopardizing the operational readiness of the safety device. In such a case, energy reserve 105 is considered to be defective. Device 108 is configured to output a signal for indicating defective energy reserve 105.

Other measures may also be carried out which are intended to ensure that the discharge of energy reserve 105 is suppressed or discontinued as quickly as possible in the event of an imminent airbag release. This may prevent a monitoring of energy reserve 105 from being carried out when an application of energy reserve 105 is imminent. An additional test lock or a termination of the monitoring may be carried out when a battery disconnection is detected. The battery disconnection may be detected with the aid of a $V_{Bat}$-low voltage threshold, i.e., when a voltage drops to the $V_{Bat}$-low voltage threshold. It is also possible to lock the test of energy reserve 105 as soon as ASIC system trigger-related signals are present, such as the release of the ignition circuits. In addition, the test of energy reserve 105 may not be started by software if initial crash information has been detected in the system, i.e., as soon as the pre-fire or crash algorithm becomes active.

In other exemplary embodiments described in greater detail below with reference to FIGS. 3 and 4, the charging operation is monitored instead of the discharging operation. According to the method described in greater detail below with reference to FIG. 3, a partial discharge of energy reserve 105 initially takes place. The energy reserve is then recharged and a period of time of recharging is evaluated by device 108. For this purpose, the device is configured to disconnect charge circuit 115 from energy reserve 105 and to connect discharge 125 until the operating voltage in energy reserve 105, beginning with a normal operating voltage, reaches a lower threshold. Compliance with the threshold is monitored at node 130 with the aid of detection unit 135 from device 108. Once the lower threshold is reached, device 108 is configured to disconnect discharge circuit 125 from energy reserve 105 and to reactivate charge circuit 115. The subsequent charging operation of energy reserve 105 is carried out until the normal operating voltage value is reached. Device 108 is configured to ascertain and evaluate a period of time of the charging operation. Depending on the period of time, device 108 is configured to decide whether the energy reserve is functional or is defective.

According to a method described in greater detail below with reference to FIG. 4, energy reserve 105, beginning with the normal operating voltage, is initially charged further and subsequently discharged again. In the process, the duration of the charging operation is evaluated by device 108. Instead of the operating voltage, beginning with the normal operating voltage value, first dropping with the aid of discharge circuit 125, it is also possible to increase the operating voltage, starting from normal operation, to an upper threshold value of the operating voltage. For this charging operation, a new setpoint value for the operating voltage or charge voltage to charge circuit 115 is predefined by device 108. A change in voltage at node 130 caused by the charging operation is detected by detection unit 135 and evaluated by device 108. A change in voltage caused as a result of the charging operation and the duration of the charging operation form the basis for calculating the capacitance present in energy reserve 105, which is compared with a setpoint value in device 108. If the capacitance of energy reserve 105 lies below the predefined setpoint value for the capacitance of energy reserve 105, a monitoring signal for a defective energy reserve 105 is then output. Once the upper threshold value for the operating voltage is reached, marking the end of the charging operation, device 108 is configured to output corresponding control signals so that charge circuit 115 is disconnected from energy reserve 105, discharge circuit 125 is connected to energy reserve 105 and the voltage present in energy reserve 105 is again lowered to the value determined for normal operation. Once the value of the operating voltage for normal operation is reached, device 108 is configured to output corresponding control signals so that charge circuit 115 is again connected to energy reserve 105 and discharge circuit 125 is disconnected from energy reserve 105. Thus, the initially prevailing state is reached once again and the monitoring may be cyclically repeated.

By monitoring the energy reserve, it is possible to check a functional capacity of the energy reserve. In particular, it may be checked whether the energy reserve is able to supply sufficient energy for operating the safety device in the event of a failure of the power supply. The monitoring of the energy reserve may be repeated several times during a driving cycle of the vehicle, for example, at predetermined timed intervals.

The driving cycle may correspond to an operating cycle of the vehicle which, in addition to the driving of the vehicle, may also include operation-related stops, such as at a traffic light or in stop-and-go traffic. Thus, the energy reserve may be monitored during the operation of the vehicle and, in particular, as the vehicle is traveling.

FIGS. 2 through 4 show voltage curves of the operating voltage during a monitoring cycle of the energy reserve for a safety device in a vehicle according to different exemplary embodiments of the present invention.

FIG. 2 shows a graphic representation of the voltage present in an energy reserve for a safety device according to one exemplary embodiment of the present invention. The energy reserve may be the energy reserve for a safety device shown in FIGS. 1a, 1b and 1c. Shown is a voltage curve in a Cartesian coordinate system during a monitoring operation of the energy reserve. Represented on the abscissa is time t and on the ordinate is voltage V present in the energy reserve.

Plotted on the ordinate are a starting value $V_1$ and a test voltage value $V_2$. Values $V_1$ and $V_2$ are indicated as dashed boundary lines in the coordinate system. Two curve profiles 210, 220 show two different voltage curves during a monitoring operation of one exemplary embodiment of the method according to the invention. The voltage has value $V_1$ up to a point in time t. Value $V_1$ thus corresponds to a normal operating voltage of the energy reserve. The monitoring operation starts at a point in time $t_1$. A discharge of the energy reserve starts from the moment in time $t_1$ on. The discharge is completed at the latest at subsequent point in time $t_2$.

Voltage curve 210 shows a voltage curve which indicates a defect of the energy reserve. Conversely, voltage curve 220 shows a voltage curve which indicates a correct function of the energy reserve.

Voltage curve 210 extends to point in time $t_1$ at the level of starting value $V_1$. At point in time $t_1$, voltage curve 210 drops sharply and intersects before point in time $t_2$ the lower threshold value defined by test voltage value $V_2$ for the voltage present in the energy reserve.

Voltage curve 220 extends to point in time $t_1$ at the level of starting value $V_1$. At point in time $t_1$, voltage curve 220 drops slowly and by point in time $t_2$ has not reached the lower threshold value defined by test voltage value $V_2$ for the voltage present in the energy reserve.

The representation of an exemplary embodiment of a monitoring according to the present invention of the voltage existing in the energy reserve for a safety device shown in FIG. 2, shows in the case of voltage curve 210 a test of a defective energy reserve, whereas voltage curve 220 represents a test of a correctly functioning energy reserve. In the exemplary embodiment of a method according to the present invention shown in FIG. 2, the time interval between point in time $t_1$ and point in time $t_2$ is defined in advance.

The method shown in FIG. 2 may be described as a method in which starting value $V_1$ is greater than test voltage value $V_2$. The voltage drop in the time period between points in time $t_1$ and $t_2$ is detected and evaluated. The voltage drop may be induced by deactivating a charge circuit of the energy reserve and activating a discharge circuit of the energy reserve. Thus, the method shown in FIG. 2 may be described as a method in which during the step of evaluating an amount of change in voltage within a predetermined period of time is evaluated.

According to one exemplary embodiment, the voltage in the energy reserve is actively lowered through brief deactivation (for example, 10 ms) of the energy reserve charge circuit and additional switching on of a current-limited charge current source (for example, 5 mA). If in the process a fixed voltage threshold $V_2$ (for example, 31 V, that is 2 V below nominal value $V_1$ of 33 V) is not reached within a fixed period, then a complete failure of the energy reserve capacity may be concluded, for example, through disconnection of the Elko or a faulty soldered joint and/or conductor path or contact. In this case, the fixed thresholds $V_1$, $V_2$ may be monitored directly in the hardware, for example by comparators, or with the aid of measurements via an ADC.

FIG. 3 shows a graphic representation of voltage present in an energy reserve for a safety device according to one exemplary embodiment of the present invention. The energy reserve may be the energy reserve for a safety device shown in FIGS. 1a, 1b and 1c. Shown is a voltage curve in a Cartesian coordinate system during a monitoring operation of the energy reserve. Represented on the abscissa is time t and on the ordinate is voltage V present in the energy reserve.

Plotted on the ordinate are a starting value $V_3$ and a test voltage value $V_4$. Values $V_3$ and $V_4$ are indicated as dashed boundary lines in the coordinate system. Two curve profiles 310, 320 show two different voltage curves during a monitoring operation of one exemplary embodiment of the method according to the invention.

Voltage curve 310 shows a voltage curve which indicates a defect of the energy reserve. Conversely, voltage curve 320 shows a voltage curve which indicates a correct function of the energy reserve.

Voltage curve 310 extends to point in time $t_3$ at the level of starting value $V_4$, then drops in a straight line until point in time $t_4$ at the level of starting value $V_3$. Between point in time $t_4$ and point in time $t_5$, voltage curve 310 rises to the level of second operating voltage $V_4$. Time interval $\Delta t_1$ is defined as the time span between point in time $t_4$ and point in time $t_5$. Voltage difference $\Delta V$ is defined as the degree of difference between starting value $V_3$ and test voltage $V_4$. Second voltage curve 320 extends to point in time $t_3$ at the level of test voltage value $V_4$ and then drops in a straight line to point in time $t_6$ at the level of starting value $V_3$. Between point in time $t_6$ and point in time $t_7$ voltage curve 320 rises to the level of second operating voltage $V_4$. Time interval $\Delta t_2$ is defined as the time span between point in time $t_6$ and point in time $t_7$. In the exemplary embodiment shown in FIG. 3, time difference $\Delta t_1$, $\Delta t_2$ is evaluated in order to draw a conclusion about the functionality of the energy reserve. During the step of evaluating, an increase from lower operating voltage value $V_3$ to comparatively higher operating voltage value $V_4$ may be evaluated over time during a charging operation in order to calculate the capacitance of the energy reserve.

The representation of an exemplary embodiment of a monitoring according to the present invention of the voltage present in the energy reserve of a safety device depicted in FIG. 3 shows in the case of voltage curve 310 a test of a defective energy reserve, whereas voltage curve 320 represents a test of a correctly functioning energy reserve. In the exemplary embodiment of a method according to the present invention shown in FIG. 3, the voltage difference between starting value $V_3$ and test voltage value $V_4$ is defined in advance.

The method shown in FIG. 3 may be described as a method in which starting value $V_3$ is smaller than test voltage value $V_4$. Voltage gain $\Delta V$ and the time interval between a first point in time $t_4$, $t_6$ and a second point in time $t_5$, $t_6$ is detected and evaluated. The voltage drop may be induced prior to the charging operation by deactivating a charge circuit of the energy reserve and activating a discharge current source of the energy reserve. If the lower operating voltage $V_3$ is reached, it is then reversed, i.e., the discharge current source is deactivated and the charge current circuit is activated. The method shown in FIG. 3 may thus be described as a method in which during the step of evaluating, an amount of time span within a predefined voltage difference is evaluated.

As in the case of the exemplary embodiment shown in FIG. 2, the energy reserve in the exemplary shown in FIG. 3 is discharged during the cyclical test with the aid of the discharge current source. The discharge time, i.e., the time span between $t_3$ and $t_4$, and the allowed discharge voltage level $V_3$ in this case may be adapted for each project and are stored in the control unit software. If the predefined discharge voltage level $V_3$ has been reached, the voltage in the energy reserve is then charged to nominal value $V_4$. The charge current used may be programmed according to a project and is very precise. In this case, voltage increase $\Delta V$ in the energy reserve during charging is monitored with the aid of ADC measurements and compared to default values.

Thus, it is possible to determine the energy reserve capacitance with a high degree of accuracy ($C=I*t/U$). If the capacitance value ascertained does not meet the required demands, i.e., it is too low, a corresponding error may then be stored and the driver informed.

According to one exemplary embodiment, the discharge from original voltage value $V_4$ to starting value $V_3$ occurs solely as a result of leakage currents in the energy reserve. This lasts considerably longer as compared to an active discharge; however, the discharge current source may, if necessary, be omitted. Since only the following charge is measured, the duration of discharge is not important, and discharging may take place without a fixed time period up to threshold $V_3$.

FIG. 4 shows a graphic representation of the voltage present in an energy reserve for a safety device according to one exemplary embodiment of the present invention. The energy reserve may be the energy reserve for a safety device shown in FIGS. 1a, 1b and 1c. Shown is a voltage curve in a Cartesian coordinate system during a monitoring operation of the energy reserve. Represented on the abscissa is time t and on the ordinate is voltage V present in the energy reserve for a safety device.

Plotted on the ordinate are a starting value $V_3$ and a test voltage value $V_4$. Values $V_3$ and $V_4$ are indicated as dashed boundary lines in the coordinate system. Two curve profiles 410, 420 show two different voltage curves during a monitoring operation of one exemplary embodiment of the method according to the invention.

Voltage curve 410 shows a voltage curve which indicates a defect of the energy reserve. Conversely, voltage curve 420 shows a voltage curve which indicates a correct function of the energy reserve.

Voltage curve 410 extends to point in time $t_8$ at the level of starting value $V_3$, then rises in a straight line until point in time $t_9$ at the level of starting value $V_4$. After point in time $t_9$, voltage curve 410 drops again to the level of first operating voltage $V_3$. Time interval $\Delta t_3$ is defined as the time span between point in time $t_8$ and point in time $t_9$. Voltage difference $\Delta V$ is defined as the degree of difference between starting value $V_3$ and test voltage $V_4$. Voltage curve 420 extends to point in time $t_8$ at the level of starting value $V_3$ then rises in a straight line up to point in time $t_{10}$ at the level of test voltage value $V_4$. After point in time $t_{10}$, voltage curve 420 drops again to the level of first operating voltage $V_3$. Time interval $\Delta t_4$ is defined as the time span between point in time $t_8$ and point in time $t_{10}$. In the exemplary embodiment shown in FIG. 4, time interval $\Delta t_3$, $\Delta t_4$ is measured and, together with predefined voltage difference $\Delta V$, the capacitance contained in the energy reserve is determined. By comparing the capacity determined in this way with a predefined capacitance for the energy reserve, a decision may be made regarding the availability of the energy reserve.

In the exemplary embodiment of the present invention underlying FIG. 4, lower operating voltage $V_3$ is left at point in time $t_8$, the lower operating voltage $V_3$ in this exemplary embodiment corresponding to the operating voltage during normal operation. The control unit shown in FIG. 1c causes the charge voltage to be increased until the voltage present in the energy reserve reaches upper operating voltage $V_4$. The charging operation is monitored and the time span for the charging operation is ascertained. Based on the time span ascertained in FIG. 4 and the predefined voltage difference, it is possible for the monitoring device to ascertain the capacitance of the energy reserve. At the point in time when the operating voltage reaches upper operating voltage value $V_4$, the control unit causes the charge circuit to become deactivated and the discharge circuit to become activated until the operating voltage has reached lower operating voltage value $V_3$. At the point in time at which the operating voltage reaches lower operating voltage value $V_3$, the discharge circuit is deactivated and the charge circuit is reactivated.

Unlike the exemplary embodiments shown in FIG. 2 and FIG. 3, the energy reserve Elko is not cyclically discharged during testing according to the exemplary embodiment shown in FIG. 4, but charged instead above the nominal value, for example, 33 V. The DC/DC step-up converter which generates the energy reserve voltage is set during the test to a higher setpoint value, for example, 34 V (thus, 1 V above nominal 33 V). The energy reserve Elko is charged to the new setpoint value with a precisely programmed current. The period until the new setpoint value is reached is measured, and from that the energy reserve capacitance (C=I*t/U) is determined and assessed. At the end of the test, the setpoint value of the step-up converter is reset to nominal value $V_3$, for example, 33 V.

This exemplary embodiment has the advantage that no useable energy is drawn from the Elko, although it should be ensured that a sufficiently safe distance to the clamping voltage of the internal ESD protection (typically: 38 V) is guaranteed.

The cyclical energy reserve monitoring may take place as follows: The test may be carried out and repeated using a software command or be reproduced in hardware in a state machine.

The withdrawal of energy in the exemplary embodiments shown by way of example in FIGS. 2 and 3 is kept to an extreme minimum as a result of short testing times and minimal energy reserve discharges, such that the system availability is not jeopardized and the period of self-sufficiency is not significantly reduced. A slow repetition rate in the range of seconds also ensures that the test has no effects on EMV compatibility or the like.

Figure 5:
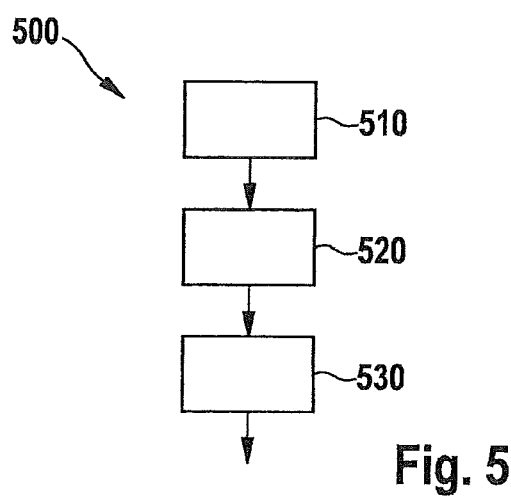
FIG. 5 shows a flow chart of a method for monitoring an energy reserve for a safety device for a vehicle according to one exemplary embodiment of the present invention.

FIG. 5 shows a flow diagram of a method 500 for monitoring an energy reserve for a safety device for a vehicle according to one exemplary embodiment of the invention introduced. In a step 510 of importing, a voltage, also referred to as a terminal voltage, is read in at the energy reserve. The value representing the voltage, not shown in FIG. 5, may be measured in a measuring step and then, in a step of importing, read in for method 500, or alternatively, in step 510 of importing, the value of the voltage may be read in via an interface. In a step 520 of evaluating, the read-in voltage is evaluated so that conclusions can be drawn about the change in voltage and, at the same time or alternatively, about the time. Based on the evaluation in step 520 of evaluating, a conclusion may be drawn about the energy reserve, such that in a step 530 a monitoring signal may be generated. With the aid of the monitoring signal it is possible, for example, to inform a driver of the vehicle of limited system functionality.

The exemplary embodiments described and shown in the figures are selected merely by way of example. Different exemplary embodiments may be combined fully with one another or with respect to individual features. An exemplary embodiment may also be supplemented by features of another exemplary embodiment. In addition, method steps according to the present invention may be repeated and implemented in a sequence different from that described.

What is claimed is:

1. A method for monitoring an energy reserve for a safety device for a vehicle, the method comprising:
partially discharging the energy reserve,
recharging the energy reserve after the partial discharge,
evaluating a period of time of the recharging from a starting value to a test voltage value,
wherein the period of time is monitored and evaluated to determine whether the energy reserve is functional.

2. The method of claim 1, wherein the evaluating is carried out repeatedly several times during a driving cycle of the vehicle.

3. The method of claim 1, further comprising:
changing the voltage present in the energy reserve between the starting value and the test voltage value to induce the change in voltage.

4. The method of claim 1, wherein the voltage present in the energy reserve is varied between the test voltage value and the starting value.

5. The method of claim 1, wherein during the evaluating, it is evaluated whether the voltage present in the energy reserve, as a result of the change in voltage, reaches the test voltage value within a predetermined period of time.

6. The method of claim 5, wherein the voltage present in the energy reserve is changed to the starting value as soon as the voltage present in the energy reserve, as a result of the change in voltage, reaches the test voltage value within a predetermined period of time.

* * * * *